3,171,715
METHOD FOR PREPARATION OF SPHERICAL THORIUM DICARBIDE AND THORIUM-URANIUM DICARBIDE PARTICLES
Alfred T. Kleinsteuber, Oak Ridge, Tenn., assignor to the United States of America as represented by the United States Atomic Energy Commission
No Drawing. Filed May 22, 1963, Ser. No. 282,518
6 Claims. (Cl. 23—14.5)

My invention relates to fuel and fertile materials for nuclear reactors and more particularly to a method of preparing thorium dicarbide and thorium-uranium dicarbide in the form of spherical particles for graphite-matrix fuel elements.

Thorium dicarbide, $ThC_2$, and thorium-uranium dicarbide, $(Th-U)C_2$, in the form of dispersed particles in a graphite matrix are useful as fertile and fuel materials for gas-cooled, power-breeder nuclear reactors. Reactors of this type are exemplified by the High Temperature Gas-Cooled Reactor, a helium-cooled, graphite-moderated experimental reactor wherein the high temperature potential of gas cooling is combined with a fuel capable of high burnup. The fuel elements for this reactor comprise ring-type graphite compacts containing thorium-uranium dicarbide at a proportion of 1 atom uranium-235 to 10 atoms thorium to 700 atoms carbon.

Fabrication of this type of fuel compact is effected by pyrolytically coating the thorium-uranium dicarbide particles with a 20 to 50 micron layer of carbon, mixing the coated particles with a suitable binder and finely divided graphite, warm-pressing into compacts and sintering. The particle size of the thorium-uranium dicarbide is critical to attainment of the desired fuel-compact performance. Fission product release from the particles increases drastically with decreasing particle size and serves to establish a minimum size limit of about 100 microns in diameter. Larger particles are also critical to the attainment of the desired fuel loading since greater volumes of coating material are required for finer particles. In general, spherical particles 100 to 250 microns in diameter are required for fuel compacts of this type, and a particle size of 200 microns is employed for the particular reactor mentioned above.

Serious difficulties have arisen in the preparation of thorium and thorium-uranium dicarbide particles of the desired size and shape. The carbides are prepared by reacting the metal or oxide or hydride of the metal with carbon at an elevated temperature. The carbide-forming reactions depend on diffusion mechanisms, and either finely divided reactants or excessively high temperatures, e.g., 2100° C., have been required. To avoid these temperatures, finely divided materials have normally been employed, and a finely divided carbide product has resulted. Sizing and shaping of the finely divided carbide has required a sequence of steps such as pelletizing by pressing in combination with a binder, sintering, crushing and screening to size. Since the carbide, particularly in a finely divided state, reacts with air or moisture, these operations have required an inert atmosphere and have proven cumbersome. In addition, a large proportion of fines which require recycling are produced. Sizing and shaping have also been accomplished by arc-melting the carbide, but this method is disadvantageous in the high temperatures required. Another problem presented in these methods is the extreme hardness of carbides and the resulting difficulty of grinding or shaping.

It is, therefore, an object of my invention to provide a method of preparing thorium dicarbide and thorium-uranium dicarbide in the form of spherical particles.

Another object is to provide a method of preparing said particles with a diameter of 100 to 250 microns.

Another object is to provide a method of preparing said particles wherein sizing and shaping are effected prior to conversion to carbide.

Another object is to provide a method of preparing said particles at a relatively low temperature.

Other objects and advantages of my invention will be apparent from the following detailed description and claims appended hereto.

In accordance with my invention spherical thorium dicarbide particles are prepared by mixing an aqueous thorium oxide sol containing nitrate ion at a nitrate-to-thorium ratio of about .05 to .15 with finely divided carbon at a carbon-to-thorium ratio of at least 4 to 1, dispersing the resulting mixture in a water-immiscible, inert organic liquid having a density approximately equivalent to said mixture, said liquid being agitated at a predetermined rate to produce dispersed spherical droplets of a controlled size, adding a sufficient amount of an organic drying agent to remove the water from and thereby solidify the droplets, separating the resulting solid spherical particles from the liquid phase and firing the particles at a temperature of at least 1400° C. in an inert atmosphere. The same process is employed for thorium-uranium dicarbide except that up to 10 atom percent uranium is incorporated in the thorium oxide sol. Spherical particles of the size desired for graphite-matrix fuel compacts are readily prepared by this means. The particles are sized and shaped prior to conversion to carbide so that handling problems are minimized. By control of agitation conditions, particle size may be varied over a wide range.

A thorium oxide sol suitable for the process of my invention may be prepared by dispersion of finely divided thorium oxide in an aqueous nitrate system. A nitrate-ion concentration of at least $10^{-3}$ to $10^{-4}$ molar and a nitrate-to-thorium molar ratio of about .05 to .15 are critical to attainment of a stable sol. Where a uranium-containing product is desired a portion of the nitrate may be supplied by providing uranium in the form of uranyl nitrate in the system. Thorium oxide may be supplied in any concentration up to about 2 molar. At higher concentrations the viscosity of the thoria sol-carbon mixture becomes too high for adequate dispersion in the organic liquid. It is preferred to use the maximum concentration, i.e., about 2 molar, since removal of less water is required in the subsequent drying step. My invention is not limited to a particular method of preparing the starting thorium oxide. It is preferred, however, to use thorium oxide prepared by contacting thorium nitrate with superheated steam at a temperature not exceeding 475° C. This material is in crystalline form, with a mean crystallite size about 50 to 200 angstroms. Other methods such as denitration of thorium nitrate in air at a temperature not exceeding 475° C., precipitation of hydrous thorium oxide or calcination of thorium oxalate at a temperature not exceeding 1000° C. may also be employed. The particle-forming procedure given below is described in detail for crystalline thorium oxide prepared by air or steam denitration of thorium nitrate. Material prepared by other methods is amorphous and variation of particle-forming conditions may be required to attain the same particle size. The sol may be prepared by adjusting the concentration of thorium oxide, nitrate and, if present, uranium to the stated levels and digesting the resulting mixture, preferably at a temperature of 80° C. to 100° C. and a pH of 3.5 to 4.0.

Finely divided carbon is combined with the thorium oxide sol at a carbon-to-thorium molar ratio of at least 4 to 1, the stoichiometric ratio for formation of thorium dicarbide. A slight excess of carbon is preferred to ensure complete conversion to the dicarbide. The term, "finely divided carbon," as used herein is intended to refer to carbon having a surface area of at least 600 square meters per gram and a mean particle size not exceeding 350 angstroms. It is preferred to use carbon having a particle size equivalent to the thorium oxide in the sol, e.g., about 70 angstroms for typical steam-denitrated oxide. The material prepared by combustion of hydrocarbons and available commercially under the designation, "channel black," is particularly suitable in this regard.

The thorium oxide sol-carbon mixture is dispersed in a suitable organic liquid under controlled conditions to produce spherical droplets. A water-immiscible organic liquid dispersant with a density approximately equivalent to the density of the thorium oxide-carbon mixture, that is, about 1.4 to 1.7 grams per cubic centimeter, is required for adequate dispersion. In addition the dispersant must have sufficient solubility for an organic drying agent to allow setting of solid particles by this means. Carbon tetrachloride meets these requirements and is highly preferred because of its low cost and safety. Other examples of suitable dispersants are trichloroethylene and perchloroethylene.

The thorium oxide sol-carbon mixture may be introduced at any proportion up to 0.4 volume per unit volume of dispersant. The system is then agitated until the aqueous phase is completely dispersed as uniform-sized droplets. The rate of agitation is controlled to produce particles of the desired size. The rate of agitation is defined herein in terms of a modified Reynolds number $$\frac{D^2 N}{V}$$

where D is diameter in centimeters of the propeller used to agitate the system, N is the number of propeller revolutions per second and V is the kinematic viscosity of the dispersant in square centimeters per second. A rate, as defined above, of $2.8 \times 10^4$ to $1.1 \times 10^4$ may be employed to produce particles from about 50 to 400 microns in diameter, with smaller particles being produced by higher rates. For particles of the desired size for graphite-matrix fuel compacts, that is, 100 to 250 microns, a rate of $2.2 \times 10^4$ to $1.5 \times 10^4$ is employed. Agitation for a period of at least about 5 minutes is required for complete dispersion.

An organic drying agent is then added to the dispersed system to remove the water from the droplets and thereby form solid spherical particles. Any organic solvent with a high degree of affinity for water, and which is miscible with the dispersant liquid, may be employed. Examples of suitable drying agents are low-molecular-weight alcohols such as methanol, ethanol and isopropanol and acetone. Isopropanol is preferred because of its low cost and lower flammability. The drying agent is added gradually to allow the particles to set without agglomeration. For particles 100 microns or less in diameter the drying agent is added over a period of about 15 to 45 minutes, and for larger particles the addition is made over a period of 45 to 200 minutes. The quantity of drying agent is preferably controlled to produce a single phase in the dispersant-water-drying agent system. For carbon tetrachloride and isopropyl alcohol a single phase with water is attained at relative volume proportions of 3 to 4.5 to 1, respectively. The resulting particles separate readily from the liquid phase and may be recovered by filtration. The particles are then dried to remove any remaining water or organic liquid. Heating in an oven at 90° C. for a period of 4 to 16 hours is suitable for this purpose.

The solid particles are then converted to thorium dicarbide by firing in an inert atmosphere at a temperature of at least 1400° C., and normally 1450° C. to 1775° C. The preferred firing conditions are a temperature of about 1775° C. for 1 hour. At lower temperatures longer times are required for complete conversion.

The resulting particles consist of thorium dicarbide or, when uranium is present, a solid solution of thorium-uranium dicarbide, together with a small amount of free carbon. These particles are suitable for pyrolytically coating with carbon and incorporation in a graphite-matrix fuel compact.

Uranium may be incorporated in the thorium dicarbide by providing uranium in the sol at a proportion up to about 10 atom percent of the total metal. At higher proportions the uranium-containing sol is unstable. Uranium values may be provided as uranyl nitrate, as a dispersible oxide such as hydrated $UO_3$ or as precipitated ammonium diuranate. Uranyl nitrate is preferred since the sol is prepared in a nitrate system.

My invention is further illustrated by the following specific examples.

Example I

A thorium oxide sol was prepared by dispersing 526 grams per liter of thorium oxide in an aqueous nitrate solution, the thorium oxide having been produced by contacting thorium nitrate with steam at a maximum temperature of 475° C. The nitrate concentration of the sol was .11 molar. Finely divided carbon having a surface area of 667 square meters per gram was added to the sol at a carbon-to-thorium ratio of 5 to 1. A 100-milliliter portion of the resulting mixture was added to 300 milliliters of agitated carbon tetrachloride in a 1-liter baffled beaker. The mixture was agitated by a paddle having a diameter of 5 centimeters and three blades at a rate of 3.85 cycles per second. The sol was dispersed in oil droplets after a period of 15 minutes. 450 milliliters of isopropyl alcohol was then added over a period of 35 minutes and the resulting mixture was agitated for an additional period of 15 minutes. The resulting solid particles were removed by filtration and were oven dried at 90° C. The particles were in the form of relatively uniform spheres with an average diameter of 194 microns. The particles were then converted to thorium dicarbide by firing at 1775° C. in argon for 6 hours. The spherical particle shape was maintained through firing.

Example II

A thorium oxide sol was prepared by digesting 538 grams of steam-denitrated thorium oxide in an aqueous system to which had been added 27 milliliters of a uranyl nitrate solution with a uranium content of 536.65 milligrams per milliliter and a nitrate content of 263 milligrams per milliliter. 123.6 grams of a finely divided carbon having a surface area of 667 square meters per gram was added to the sol, along with sufficient water to produce a final volume of 1 liter. A 100-milliliter portion of the resulting mixture was added to 300 milliliters of carbon tetrachloride in the apparatus of Example I, and the system was agitated at 4.4 revolutions per second for 15 minutes. 450 milliliter of isopropyl alcohol was then added over a period of 20 minutes and the resulting mixture was agitated for an additional period of 50 minutes. The resulting solid spherical particles were removed by filtration and were oven dried at 90° C. The particles were in the form of relatively uniform spheres with an average diameter of 132 microns. The particles were then converted to thorium-uranium dicarbide by firing at 1775° C. in argon for 6 hours. Spherical shape was maintained through firing.

The above examples are merely illustrative and are not to be construed as limiting the scope of my invention, which is limited only as indicated by the attached claims.

Having thus described my invention, I claim:

1. The method of preparing spherical thorium dicarbide particles which comprises mixing an aqueous thorium oxide sol containing nitrate at a nitrate-to-thorium ratio of about .05 to .15 with finely divided carbon at a carbon-to-thorium ratio of at least 4 to 1, dispersing the resulting mixture in an agitated water-immiscible, inert organic liquid dispersant having a density substantially equivalent to said mixture, said liquid being agitated at a predetermined rate whereby spherical droplets of a controlled size are formed, adding a sufficient amount of an organic liquid drying agent selected from the group consisting of low-molecular-weight alcohols and acetone to the resulting dispersion to remove the water from said droplets and thereby solidify said droplets, separating the resulting spherical particles from the remaining liquid and firing said particles at a temperature of at least 1400° C. in an inert atmosphere.

2. The method of claim 1 wherein uranium values are provided in said sol at a proportion up to 10 weight percent of the total metal therein.

3. The method of claim 1 wherein said liquid dispersant containing said mixture is agitated at a rate sufficient to produce a state of agitation characterized by a modified Reynolds number of $1.1 \times 10^4$ to $2.8 \times 10^4$.

4. The method of claim 1 wherein said liquid dispersant is selected from the group consisting of carbon tetrachloride, trichloroethylene and perchloroethylene.

5. The method of preparing spherical thorium dicarbide particles 100 to 250 microns in diameter which comprises mixing an aqueous thorium oxide sol containing nitrate at a nitrate-to-thorium ratio of .05 to .15 and thorium oxide at a concentration not exceeding about 2 molar with finely divided carbon at a carbon-to-thorium ratio of at least 4 to 1, adding the resulting mixture to carbon tetrachloride, agitating the resulting dispersion at a rate sufficient to produce a state of agitation characterized by a modified Reynolds number of $1.5 \times 10^4$ to $2.2 \times 10^4$, whereby spherical droplets are formed, gradually adding a sufficient amount of an organic liquid selected from the group consisting of low-molecular-weight alcohols and acetone to said dispersion to remove the water from and thereby solidify said droplets, separating the resulting spherical particles from the resulting liquid phase and firing said particles at a temperature of at least 1400° C. in an inert atmosphere.

6. The method of claim 5 wherein uranium values are dispersed in said sol at a proportion up to about 10 atom percent of the total metal therein.

References Cited by the Examiner
UNITED STATES PATENTS
2,928,721    3/60    Mason et al. _____ 23—14.5

OTHER REFERENCES
AEC Document, TID–11, 494, April 1960, pp. 4–9.

CARL D. QUARFORTH, *Primary Examiner.*